US010694652B2

(12) United States Patent
Cote

(10) Patent No.: US 10,694,652 B2
(45) Date of Patent: Jun. 30, 2020

(54) DIGGING IMPLEMENT, DIGGING IMPLEMENT ATTACHMENT AND METHODS OF USING SAME

(71) Applicant: Mario Cote, Sherbrooke (CA)

(72) Inventor: Mario Cote, Sherbrooke (CA)

( * ) Notice: Subject to any disclaimer, the term of this patent is extended or adjusted under 35 U.S.C. 154(b) by 495 days.

(21) Appl. No.: 15/300,559

(22) PCT Filed: Apr. 2, 2015

(86) PCT No.: PCT/CA2015/000229
§ 371 (c)(1),
(2) Date: Sep. 29, 2016

(87) PCT Pub. No.: WO2015/154163
PCT Pub. Date: Oct. 15, 2015

(65) Prior Publication Data
US 2018/0359899 A1    Dec. 20, 2018

(30) Foreign Application Priority Data

Apr. 7, 2014    (CA) .................................. 1406228.5

(51) Int. Cl.
*B66F 15/00*    (2006.01)
*A01B 1/02*    (2006.01)

(52) U.S. Cl.
CPC .............. *A01B 1/026* (2013.01); *A01B 1/028* (2013.01)

(58) Field of Classification Search
CPC . B66F 15/00; A01B 1/00; A01B 1/026; A01B 1/022; E02F 3/00; E02F 3/02
See application file for complete search history.

(56) References Cited

U.S. PATENT DOCUMENTS

| 15,628 | A | 8/1856 | Woolscxn |
| 59,061 | A | 10/1866 | Pattebson |
| 66,169 | A | 6/1867 | Woosteb |
| 2,269,119 | A | 1/1942 | Mason |

(Continued)

FOREIGN PATENT DOCUMENTS

| CN | 2680738 | 2/2005 |
| CN | 204000978 | 12/2014 |

(Continued)

OTHER PUBLICATIONS

Written Opinion of the International Searching Authority issued by the World Intellectual Property Organization dated Jul. 13, 2015 for PCT application PCT/CA2015/000229 from which the present application claims priority.

(Continued)

*Primary Examiner* — Lee D Wilson

(57) ABSTRACT

A digging implement including: a digging head (16); a substantially elongated main shaft (12) extending from the digging head (16); a main handle (14) secured to the main shaft (12) substantially opposed to the digging head (16); and an auxiliary handle assembly (140) and a footplate assembly (160) both mounted to the main shaft (12) between the digging head (16) and the main handle (14), the auxiliary handle assembly (140) and foot plate assembly (160) being each mountable to the main shaft (12) at different longitudinally spaced apart positions therealong.

35 Claims, 8 Drawing Sheets

(56) References Cited

U.S. PATENT DOCUMENTS

| | | | | |
|---|---|---|---|---|
| 2,419,015 | A * | 4/1947 | Gascoigne | A01B 1/04 254/131.5 |
| 2,769,612 | A | 11/1956 | Weisheit | |
| 3,035,810 | A | 5/1962 | Conant | |
| 4,198,090 | A | 4/1980 | Gutman | |
| 4,461,458 | A * | 7/1984 | Poulin | A01B 1/028 254/131.5 |
| 4,722,512 | A | 2/1988 | Lighthizer | |
| 4,881,332 | A | 11/1989 | Evertsen | |
| 5,431,468 | A * | 7/1995 | Rosenshine | A01B 1/026 294/54.5 |
| 5,447,349 | A | 9/1995 | Coble | |
| 5,669,651 | A * | 9/1997 | Vroegindewey | A01B 1/028 254/131.5 |
| 5,732,933 | A * | 3/1998 | Champi | B66F 15/00 254/131.5 |
| 5,918,921 | A * | 7/1999 | Samuelson | E01H 5/02 294/54.5 |
| 6,086,049 | A | 7/2000 | Sheils | |
| 6,203,081 | B1 | 3/2001 | Kegan, Sr. | |
| 6,485,076 | B1 | 11/2002 | Chang | |
| 6,663,085 | B1 * | 12/2003 | Dalon | A01B 1/028 254/131.5 |
| 6,922,920 | B1 | 8/2005 | Stratz | |
| 9,204,587 | B2 * | 12/2015 | Cordeiro | E01H 5/02 |
| 9,943,953 | B2 * | 4/2018 | Fritz | B25G 3/20 |
| 2006/0214443 | A1 | 9/2006 | Dixon | |
| 2012/0137548 | A1 | 6/2012 | Kimball | |
| 2018/0359899 | A1 * | 12/2018 | Cote | A01B 1/026 |

FOREIGN PATENT DOCUMENTS

| | | |
|---|---|---|
| GB | 142670 | 5/1920 |
| GB | 258479 | 9/1926 |
| GB | 336993 | 10/1930 |
| GB | 547775 | 9/1942 |
| GB | 2233539 | 1/1991 |
| GB | 2436056 | 9/2007 |
| GB | 2460905 | 12/2009 |
| WO | 2002080650 | 10/2002 |

OTHER PUBLICATIONS

International Search Report issued by the World Intellectual Property Organization dated Jul. 13, 2015 for PCT application PCT/CA2015/000229 from which the present application claims priority.

* cited by examiner

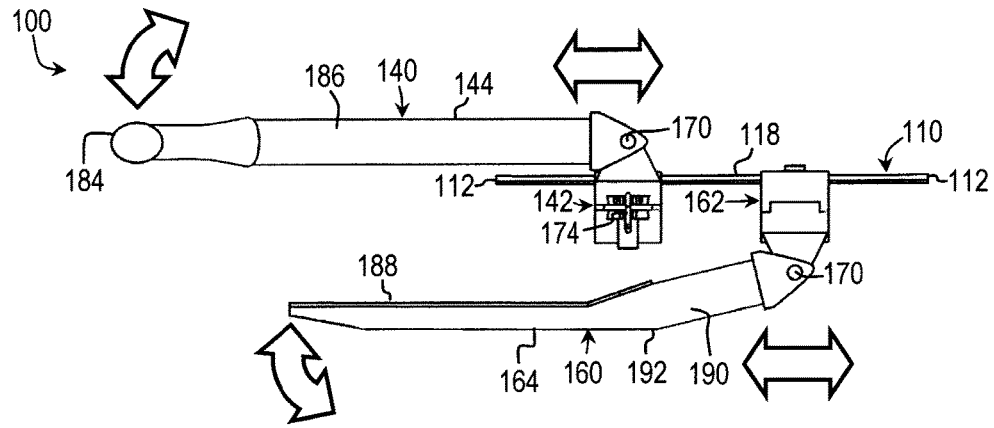
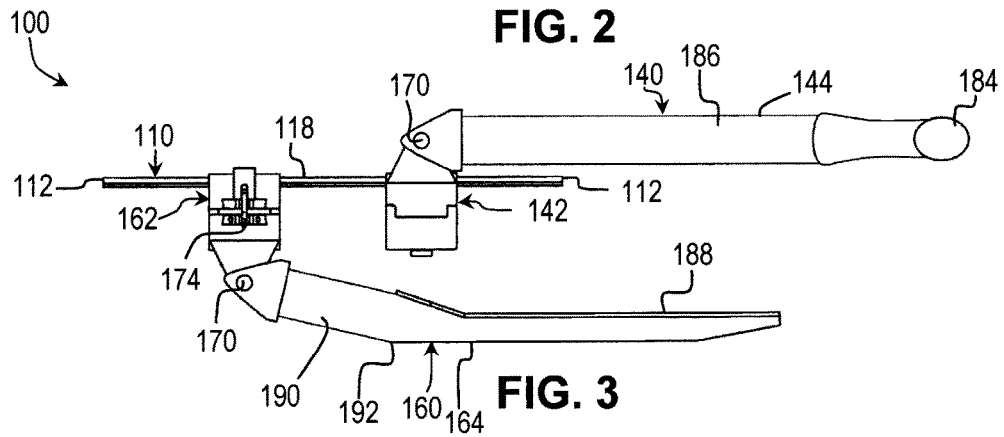
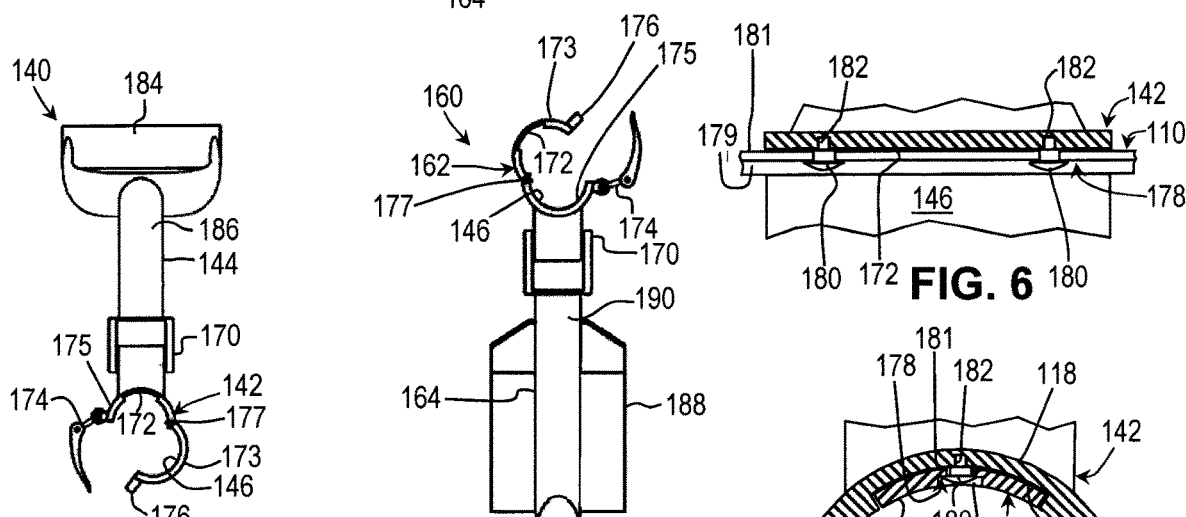

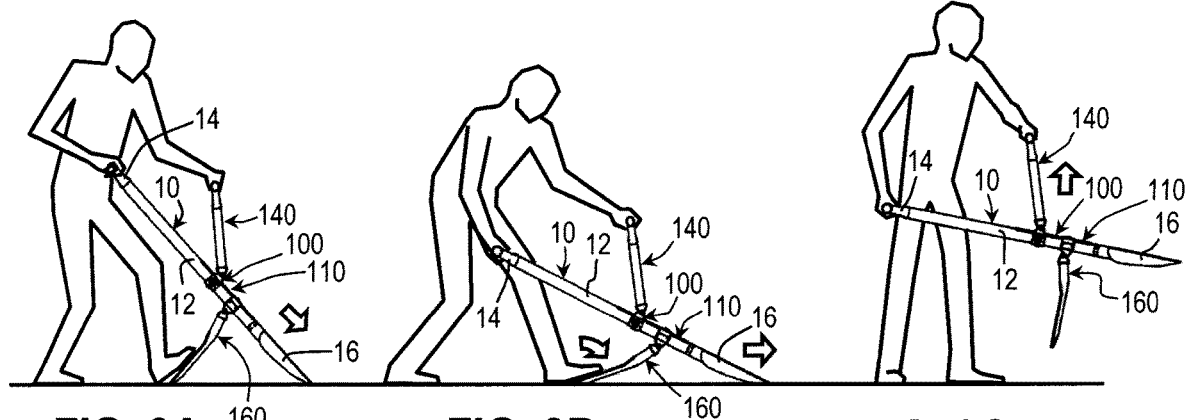
FIG. 9A  FIG. 9B  FIG. 9C
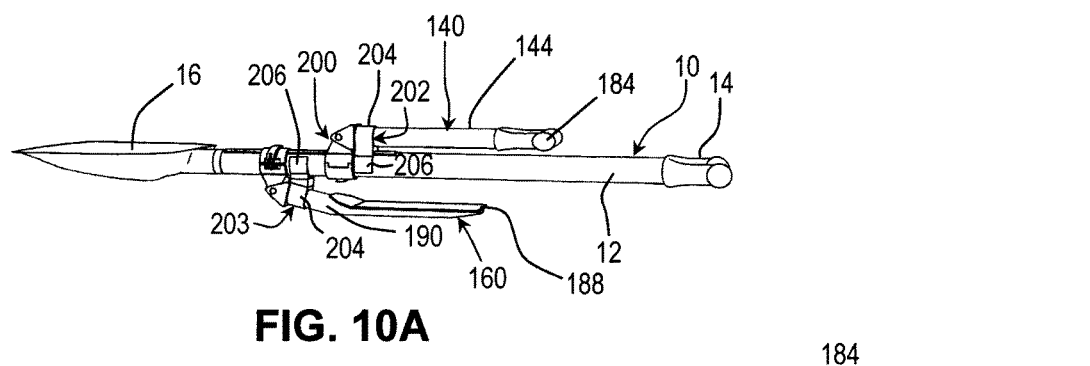
FIG. 10A
FIG. 10B

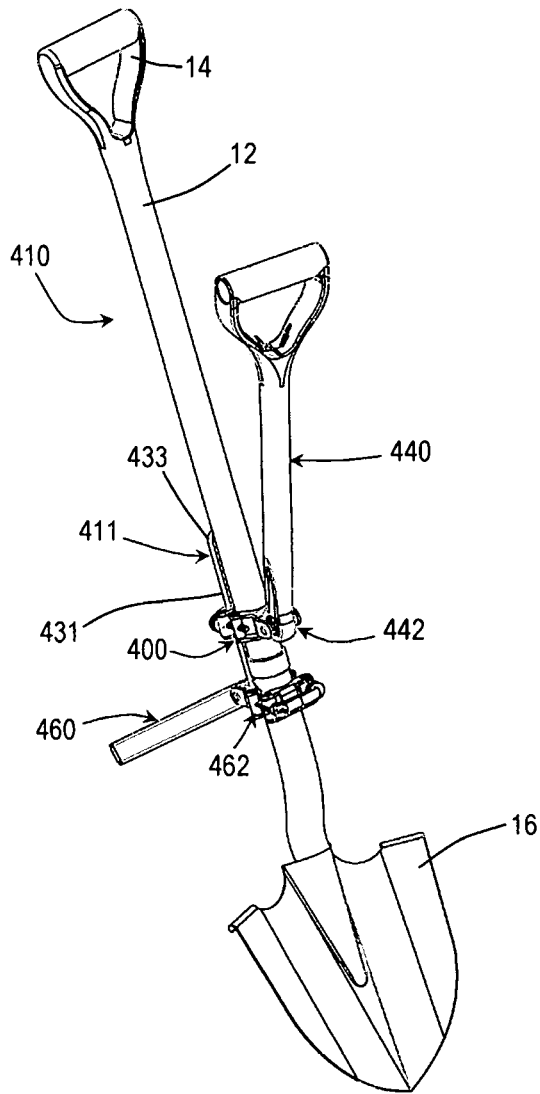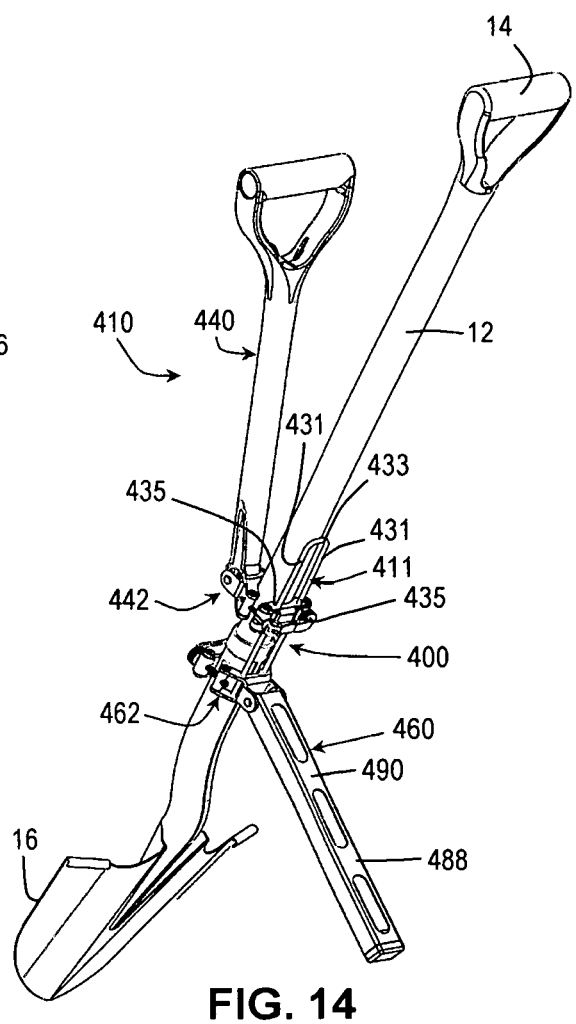
FIG. 13
FIG. 14

DIGGING IMPLEMENT, DIGGING IMPLEMENT ATTACHMENT AND METHODS OF USING SAME

The present application claims benefit from UK request application 1406228.5 filed Apr. 7, 2014, the contents of which is hereby incorporated by reference in its entirety.

FIELD OF THE INVENTION

The present invention relates generally to digging, and, more particularly, to a digging implement, a digging implement attachment and methods of using same.

BACKGROUND

Shovel attachments usable for helping or facilitating the use of a garden shovel, a garden fork, a snow shovel, or the likes, during digging and shoveling operations, are known.

In some instances, these known shovel attachments generally consist of a handle component having a substantially elongated configuration defining a handgrip portion at a one end thereof, and a shovel attachment means at the opposite end thereof. The shovel attachment means is fixedly or selectively attached to the elongated handle shaft of the shovel, with the handgrip portion extending substantially upwardly therefrom. The handle component thus attached to the handle shaft of a shovel or the like allows a user to typically handle the shovel with one hand grasping the distal end of the shovel handle shaft in a conventional manner, and the other hand grasping the handle grip portion of the handle component. Thus, the user does not have to bend as much as with a conventional shovel during shoveling operations.

In some other instances, these known shovel attachments generally consist of a footplate component having a substantially elongated configuration defining a footplate member at a one end thereof, and a shovel attachment means at the opposite end thereof. The shovel attachment means is fixedly or selectively attached to the elongated handle shaft of the shovel, with the footplate member descending downwardly therefrom. The footplate component thus attached to a shovel allows a user to typically handle the handle shaft in a conventional manner and, with one foot pressing on the footplate member, provides an additional forward trust on the shovel head in order to dig deeper in the material to be shoveled.

In some other instances of known shovel attachments, the attachment is represented by a combination of both a handle component and a footplate component, for enjoying the advantages brought by both components as described above. Furthermore, it is to be noted that the component attachment means of both the handle and the handle components are generally integrated into a same attachment means to the shovel and, thus, are not individually position adjustable relative to the handle shaft of the shovel.

While these prior art shovel attachments can generally fulfill the main objective of facilitating the use of a garden shovel or the likes, they also generally entail more than one drawback.

For example, the shovel attachments comprising a handle and/or a footplate component that are attached at a fixed location along the handle shaft of the shovel are generally configured and sized for, and thus, are generally more comfortable to use by, a person having standard body dimensions. Relatively taller or shorter persons using such attachments on a shovel may experience fatigue and muscle and/or articulation pain in the elbow, wrist, knee or ankle, which can greatly diminish the advantages of using such attachments with a shovel.

Furthermore, shovel attachments having their position user selectively adjustable along the handle shaft of a shovel entail other disadvantages during digging and shoveling operations. A first disadvantage is rendered more evident when digging a hole or a trench in the ground. As the hole or trench progresses in depth, the user often ends up standing on a slanted surface along an edge surface portion thereof, with the shovel head having either to dig deeper in the earth, scrape material along a substantially horizontal surface or, in some complex digging operations, having to dig earth at an angle along an upwardly oriented axis. All these situations substantially change the operational geometry of the shovel relative to the standing position of the user which, in turn, forces the latter to repeatedly re-adjust the position of the attachment relative to the handle shaft as the shoveling operation progresses. The repeated re-adjustments of the attachment more often than not require both hands and precision manipulations of the user since, the handle shaft being typically circular in cross-section, the relocation of the attachment need to be done carefully in order to maintain the perpendicular axis of the handle and/or footplate components relative to an imaginary horizontal plane represented by the periphery of the shovel head. Otherwise, the misalignment therebetween renders the combination of the shovel and shovel attachment rather uncomfortable and inefficient to use. Consequently, the relatively long procedure of each position adjustment of the attachment, often immediately followed with subsequent corrections thereto, induces undesired cumulative delays to the whole shoveling operation.

Another drawback that particularly concerns shovel attachments that are represented by an integrated combination of a handle component and a footplate component resides in that, although the attachment may be selectively positionable relative to the handle shaft, the individual position of each component in the attachment cannot be adjusted relative to one another. Thus it is not possible, as is sometimes required, to position the handle component substantially closer to the distal end of the handle shaft, relative to the footplate component or, inversely, to position the handle component between the footplate component and the shovel head, unless two separate auxiliary components are used. In either cases, the same long adjustment procedure of the components required to have the latter diametrically opposed, as well as perpendicularly oriented relative to the shovel head are encountered.

In view of the above, there is a need in the industry for an improved digging implement.

An object of the present invention is to provide such a digging implement.

SUMMARY OF THE INVENTION

In a broad aspect, the invention provides a digging implement, the digging implement comprising: a digging head; a substantially elongated main shaft extending from the digging head; a main handle secured to the main shaft substantially opposed to the digging head; an auxiliary handle assembly mounted to the main shaft between the digging head and the main handle, the auxiliary handle assembly being mountable to the main shaft at auxiliary handle assembly first and second positions that are longitudinally spaced apart from each other along the main shaft; and a footplate assembly mounted to the main shaft between the digging head and the main handle, the footplate assembly being mountable to the main shaft at footplate assembly first and second positions that are longitudinally spaced apart from each other along the main shaft.

The invention may also provide a digging implement wherein the footplate assembly is mounted to the main shaft between the auxiliary handle assembly and the digging head.

The invention may also provide a digging implement wherein the auxiliary handle and footplate assemblies are alternatively mountable to the main shaft spaced apart from each other by at least two different longitudinal distances therebetween.

The invention may also provide a digging implement further comprising a linking element operatively coupled to the auxiliary handle and footplate assemblies for maintaining substantially fixed a relative angular position therebetween about the main shaft as the auxiliary handle assembly is moved between the auxiliary handle assembly first and second positions and the footplate assembly is moved between the footplate assembly first and second positions.

The invention may also provide a digging implement wherein the auxiliary handle assembly includes an auxiliary handle attachment for mounting the auxiliary handle assembly to the main shaft; an auxiliary handle graspable by a hand; and an auxiliary handle spacing element extending therebetween.

The invention may also provide a digging implement wherein the auxiliary handle attachment includes a clamp operable between a locked configuration and an unlocked configuration, wherein, in the locked configuration, the clamp grips the main shaft to substantially prevent longitudinal movements of the clamp along the main shaft, and, in the unlocked configuration, the clamp is loosened relative to the main shaft so as to be longitudinally movable therealong.

The invention may also provide a digging implement wherein in the unlocked configuration, the clamp is irremovable from the main shaft, the clamp being further operable to an open configuration wherein the clamp is removable from the main shaft.

The invention may also provide a digging implement wherein the auxiliary handle spacing element is pivotally mounted to the auxiliary handle attachment so as to be movable between auxiliary handle spacing element first and second positions, the auxiliary handle spacing element and main shaft having different angular relationships therebetween in the auxiliary handle spacing element first and second positions.

The invention may also provide a digging implement wherein the auxiliary handle spacing element and main shaft are substantially parallel to each other in the auxiliary handle spacing element first position.

The invention may also provide a digging implement further comprising a releasable auxiliary handle assembly storage attachment for reversibly securing the auxiliary handle spacing element to the main shaft in the auxiliary handle spacing element first position.

The invention may also provide a digging implement wherein the auxiliary handle spacing element is mounted to the auxiliary handle attachment so as to be pivotable relative thereto about at least two different pivoting axes.

The invention may also provide a digging implement wherein the auxiliary handle spacing element is mounted to the auxiliary handle attachment so as to be rotatable about an auxiliary handle spacing element longitudinal axis extending between the auxiliary handle attachment and the auxiliary handle.

The invention may also provide a digging implement wherein the footplate assembly includes a footplate attachment for mounting the footplate assembly to the main shaft; a footplate; and a footplate spacing element extending therebetween.

The invention may also provide a digging implement wherein the footplate attachment includes a clamp operable between a locked configuration and an unlocked configuration, wherein, in the locked configuration, the clamp grips the main shaft to substantially prevent longitudinal movements of the clamp along the main shaft, and, in the unlocked configuration, the clamp is loosened relative to the main shaft so as to be longitudinally movable therealong.

The invention may also provide a digging implement wherein in the unlocked configuration, the clamp is irremovable from the main shaft, the clamp being further operable to an open configuration wherein the clamp is removable from the main shaft.

The invention may also provide a digging implement wherein the footplate spacing element is pivotally mounted to the footplate attachment so as to be movable between footplate spacing element first and second positions, the footplate spacing element and main shaft having different angular relationships therebetween in the footplate spacing element first and second positions.

The invention may also provide a digging implement wherein the footplate spacing element and main shaft are substantially parallel to each other in the footplate spacing element first position.

The invention may also provide a digging implement further comprising a releasable footplate assembly storage attachment for reversibly securing the footplate spacing element to the main shaft in the footplate spacing element first position.

The invention may also provide a digging implement wherein the footplate spacing element defines a footplate spacing element protrusion configured and sized to limit pivotal movement of the footplate spacing element beyond the footplate spacing element second position by abutting against the main shaft.

The invention may also provide a digging implement wherein the linking element is substantially elongated and defines a slot extending therealong, the auxiliary handle assembly and footplate assembly being mounted to the linking element so as to engage the slot so that the auxiliary handle assembly and footplate assembly are movable relative to the slot only through longitudinal movements therealong.

The invention may also provide a digging implement wherein the auxiliary handle assembly and footplate assembly each include a pair of pegs longitudinally spaced apart from each other and engaging the slot.

The invention may also provide a digging implement wherein the linking element defines substantially opposed linking element first and second surfaces, the linking element second surface facing the main shaft; the slot extends through the linking element between the linking element first and second surfaces, the slot defining a slot narrower portion substantially adjacent the linking element first surface and a slot wider portion substantially adjacent the linking element second surface, the slot wider portion extending laterally to a larger extent than the slot narrower portion; and the pegs each define a peg narrower portion received in the slot narrower portion and a peg wider portion received in the slot wider portion, the peg wider portion being too large to go through the slot narrower portion when the peg narrower portion is engaged in the slot narrower portion.

The invention may also provide a digging implement wherein one of the footplate assembly and auxiliary handle assembly is fixed relative to the linking element and an other one of the footplate assembly and auxiliary handle assembly is selectively movable relative to the linking element.

The invention may also provide a digging implement wherein the other one of the footplate assembly and auxiliary handle assembly is continuously movable relative to the linking element so that a distance between the footplate assembly and auxiliary handle assembly is settable continuously between a minimal distance and a maximal distance.

The invention may also provide a digging implement wherein the other one of the footplate assembly and auxiliary handle assembly is lockable relative to the linking element only at discrete positions therealong so that a distance between the footplate assembly and auxiliary handle assembly is settable only to discrete distances between a minimal distance and a maximal distance.

The invention may also provide a digging implement wherein the footplate assembly, auxiliary handle assembly and linking element form a digging implement attachment removably attachable to the main shaft.

The invention may also provide a digging implement wherein the digging implement attachment is removable from the main shaft as a single unit.

The invention may also provide a digging implement wherein the linking element defines a linking element shaft abutting surface, the linking element shaft abutting surface conforming to the main shaft.

In another broad aspect, the invention provides a digging implement attachment usable with a digging implement including a digging head, a substantially elongated main shaft extending from the digging head, and a main handle secured to the main shaft substantially opposed to the digging head, the digging implement attachment comprising: an auxiliary handle assembly mountable to the main shaft at auxiliary handle assembly first and second positions that are longitudinally spaced apart from each other along the main shaft; a footplate assembly mountable to the main shaft at footplate assembly first and second positions that are longitudinally spaced apart from each other along the main shaft; and a linking element operatively coupled to the auxiliary handle and footplate assemblies for maintaining substantially fixed a relative angular position therebetween relative to the linking element as the auxiliary handle assembly is moved between the auxiliary handle assembly first and second positions and the footplate assembly is moved between footplate assembly first and second positions when the digging implement attachment is operatively mounted to the digging implement.

The invention may also provide a digging implement attachment wherein the auxiliary handle assembly includes an auxiliary handle attachment mountable to the main shaft; an auxiliary handle; and an auxiliary handle spacing element extending therebetween.

The invention may also provide a digging implement attachment wherein the auxiliary handle attachment includes a clamp operable between a locked configuration and an unlocked configuration, wherein, with the digging implement attachment operatively mounted to the main shaft, in the locked configuration, the clamp grips the main shaft to substantially prevent longitudinal movements of the clamp along the main shaft, and, in the unlocked configuration, the clamp is loosened relative to the main shaft so as to be longitudinally movable therealong.

The invention may also provide a digging implement attachment wherein the auxiliary handle spacing element is pivotally mounted to the auxiliary handle attachment.

The invention may also provide a digging implement attachment further comprising a releasable auxiliary handle assembly storage attachment for reversibly securing the auxiliary handle spacing element and the main shaft to each other in a predetermined angular relationship relative to each other when the digging implement attachment is operatively mounted to the main shaft.

The invention may also provide a digging implement attachment wherein the auxiliary handle spacing element is mounted to the auxiliary handle attachment so as to be pivotable relative thereto about at least two different pivoting axes.

The invention may also provide a digging implement attachment wherein the auxiliary handle spacing element is mounted to the auxiliary handle attachment so as to be rotatable about an auxiliary handle spacing element longitudinal axis extending between the auxiliary handle attachment and the auxiliary handle.

The invention may also provide a digging implement attachment, wherein the footplate assembly includes a footplate attachment for mounting the footplate assembly to the main shaft; a footplate; and footplate spacing element extending therebetween.

The invention may also provide a digging implement attachment wherein the footplate attachment includes a clamp operable between a locked configuration and an unlocked configuration, wherein, with the digging implement attachment operatively mounted to the main shaft, in the locked configuration, the clamp grips the main shaft to substantially prevent longitudinal movements of the clamp along the main shaft, and, in the unlocked configuration, the clamp is loosened relative to the main shaft so as to be longitudinally movable therealong.

The invention may also provide a digging implement attachment wherein the footplate spacing element is pivotally mounted to the footplate attachment.

The invention may also provide a digging implement attachment further comprising a releasable footplate assembly storage attachment for reversibly securing the footplate spacing element and the main shaft to each other in a predetermined angular relationship relative to each other when the digging implement attachment is operatively mounted to the main shaft.

The invention may also provide a digging implement attachment wherein the footplate spacing element defines a footplate spacing element protrusion configured and sized to limit pivotal movement of the footplate spacing element beyond a predetermined angle relative to the main shaft when operatively mounted to the main shaft by abutting against said main shaft.

The invention may also provide a digging implement attachment wherein the linking element is substantially elongated and defines a slot extending therealong, the auxiliary handle assembly and footplate assembly being mounted to the linking element so as to engage the slot so that the auxiliary handle assembly and footplate assembly are movable relative to the slot only through longitudinal movements therealong.

The invention may also provide a digging implement attachment wherein the linking element defines substantially opposed linking element first and second surfaces, the linking element second surface facing said main shaft when said digging implement attachment is operatively mounted to said main shaft; and said linking element second surface is concave.

The invention may also provide a digging implement attachment wherein one of the footplate assembly and auxiliary handle assembly is fixed relative to the linking element and an other one of the footplate assembly and auxiliary handle assembly is selectively movable relative to the linking element.

The invention may also provide a digging implement attachment wherein the other one of the footplate assembly and auxiliary handle assembly is continuously movable relative to the linking element so that a distance between the footplate assembly and auxiliary handle assembly is settable continuously between a minimal distance and a maximal distance.

The invention may also provide a digging implement attachment wherein the other one of the footplate assembly and auxiliary handle assembly is lockable relative to the linking element only at discrete positions therealong so that a distance between the footplate assembly and auxiliary handle assembly is settable only to discrete distances between a minimal distance and a maximal distance.

Advantageously, the proposed digging implement may be manufactured relatively inexpensively using known materials and methods. The proposed digging implement is relatively ergonomic and, in some embodiments, allows rapid adjustment of the positions of the auxiliary handle assembly and footplate assembly relatively rapidly using a small number of easy to perform steps.

Also, the proposed digging implement attachment may be in some embodiments retrofitted to existing digging implements.

Other objects, advantages and features of the present invention will become more apparent upon reading of the following non-restrictive description of some embodiments thereof, given by way of example only with reference to the accompanying drawings.

BRIEF DESCRIPTION OF THE DRAWINGS

FIG. 2, in a side elevational view, illustrates the digging implement attachment of FIG. 1;

FIG. 3, in a side elevational view opposite the one in FIG. 2, illustrates the digging implement attachment of FIGS. 1 and 2;

FIG. 4, in a front elevational view, illustrates an auxiliary handle assembly part of the digging implement attachment of FIGS. 1 to 3;

FIG. 5, in a front elevational view, illustrates a footstep assembly part of the digging implement attachment of FIGS. 1 to 3;

FIG. 6, in an enlarged, longitudinal cross-section view, illustrates an assembly of a linking element part of the digging implement attachment of FIGS. 1 to 3 with a clamp part of the auxiliary handle and footplate assemblies of FIGS. 4 and 5;

FIG. 7, in an enlarged, lateral cross-section view, illustrates the assembly of the linking element shown in FIG. 6 with the clamp of FIGS. 4, 5 and 6;

FIGS. 9A, 9B and 9C, in sequential environmental views, illustrate the digging implement attachment of FIGS. 1 to 3 during use, the digging implement attachment being part of a digging implement;

FIG. 10A, in a perspective view, illustrates a digging implement including an alternate embodiment of a digging implement attachment according to the present invention, here shown in a retracted configuration; and FIG. 10B, in a perspective view, illustrates the digging implement of FIG. 10A, here shown in a deployed configuration;

FIG. 13, in a perspective view, illustrates another alternate digging implement including yet another alternate embodiment of a digging implement attachment in accordance with the present invention;

FIG. 14, in an alternate perspective view, illustrates the digging implement of FIG. 13.

DETAILED DESCRIPTION

Figure 1:
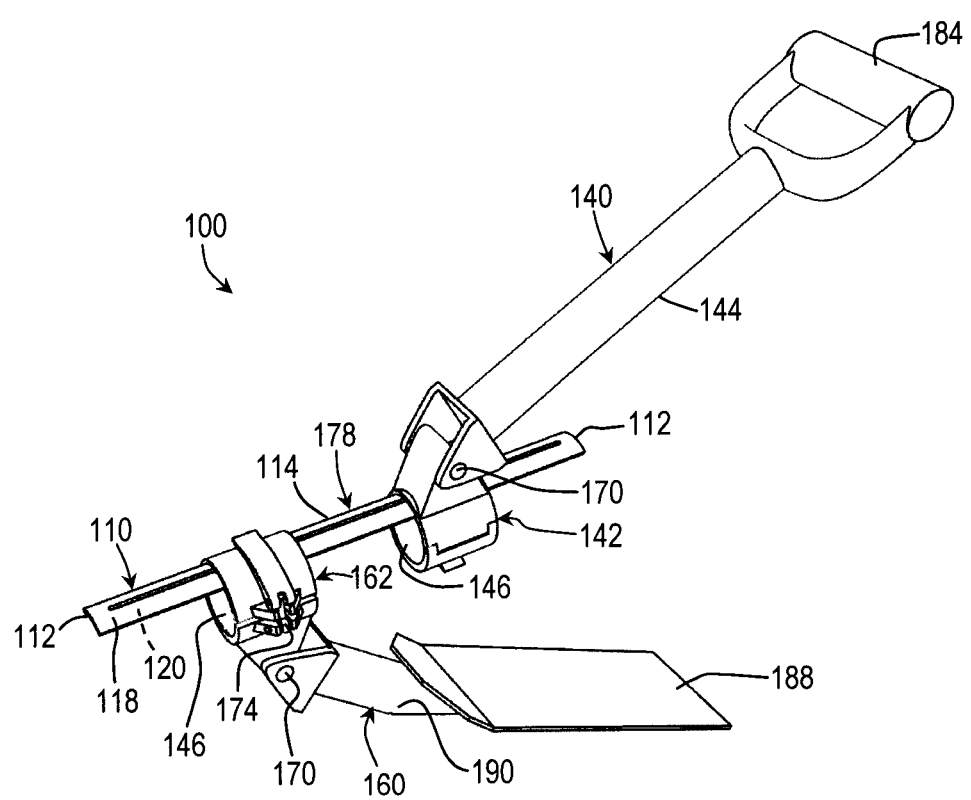
FIG. 1, in a perspective view, illustrates an embodiment of a digging implement attachment according to the present invention.

The term "substantially" is used throughout this document to indicate variations in the thus qualified terms. These variations are variations that do not materially affect the manner in which the invention works and can be due, for example, to uncertainty in manufacturing processes or to small deviations from a nominal value or ideal shape that do not cause significant changes to the invention. These variations are to be interpreted from the point of view of the person skilled in the art.

FIGS. 1 to 8 show various aspects of an embodiment of a digging implement attachment 100, according to the present invention. As seen for example in FIGS. 9A to 9C, the digging implement attachment 100 is part of a digging implement 10 including a digging head 16, a substantially elongated main shaft 12 extending from the digging head 16 and a main handle 14 secured to the main shaft 12 substantially opposed to the digging head 16. The digging implement attachment 100 is typically adjustably attachable along the main shaft 12 of the digging implement 10, between the main handle 14 and the digging head 16, and, in some embodiments, removable therefrom, for example as a single unit. The drawings illustrate a digging implement 10 in the form of a shovel, more specifically a garden shovel. However, in other embodiments, the digging implement 10 is any conventional digging and shoveling hand tool such as, for examples, a garden shovel, a garden fork, a snow shovel, or the likes.

Referring for example to FIGS. 9A to 9C, the digging implement attachment 100 includes an auxiliary handle assembly 140 mounted to the main shaft 12 between the digging head 16 and the main handle 14. The auxiliary handle assembly 140 is mountable to the main shaft 12 at auxiliary handle assembly first and second positions that are longitudinally spaced apart from each other along the main shaft 12, as described in further details hereinbelow. Also, the digging implement attachment 100 includes a footplate assembly 160 mounted to the main shaft 12 between the digging head 16 and the main handle 14. The footplate assembly 160 is also mountable to the main shaft 12 at footplate assembly first and second positions that are longitudinally spaced apart from each other along the main shaft 12.

Typically, the footplate assembly 160 is mounted to the main shaft 12 between the auxiliary handle assembly 140 and the digging head 16, but this relationship may be reversed in some embodiments of the invention. Typically, the auxiliary handle and footplate assemblies 140 and 160 are alternatively mountable to the main shaft 12 spaced apart from each other by at least two different longitudinal distances therebetween.

The digging implement attachment 100 also includes a linking element 110 operatively coupled to the auxiliary handle and footplate assemblies 140 and 160 for maintaining substantially fixed a relative angular position therebetween about the main shaft 12 as the auxiliary handle assembly 140 is moved between the auxiliary handle assembly first and second positions and the footplate assembly 160 is moved between the footplate assembly first and second positions. However, in alternative embodiments, there are no linking elements 110. Typically, the auxiliary handle and footplate assemblies 140 and 160 are on opposite sides of the main shaft 12, so that in typical use, the footplate assembly 160 is below the main shaft 12, and the auxiliary handle assembly 140 is above the main shaft 12.

Referring for example to FIG. 1, in some embodiments, the linking element 110 has a substantially elongated configuration defining a pair of spaced apart linking element ends 112 and a linking element intermediate portion 114 extending therebetween. The linking element 110 further defines substantially opposed linking element first and second surfaces 118 and 120, the linking element second surface 120 facing the main shaft 12. Typically, the linking element second surface 120 is shaped and sized to substantially conform to and for substantially abutting longitudinally along a longitudinally extending surface portion of the main shaft 12. To that effect, as best illustrated in FIG. 7, the linking element second surface 120 is substantially semi-circular in cross-section, and therefore concave.

Figure 8:
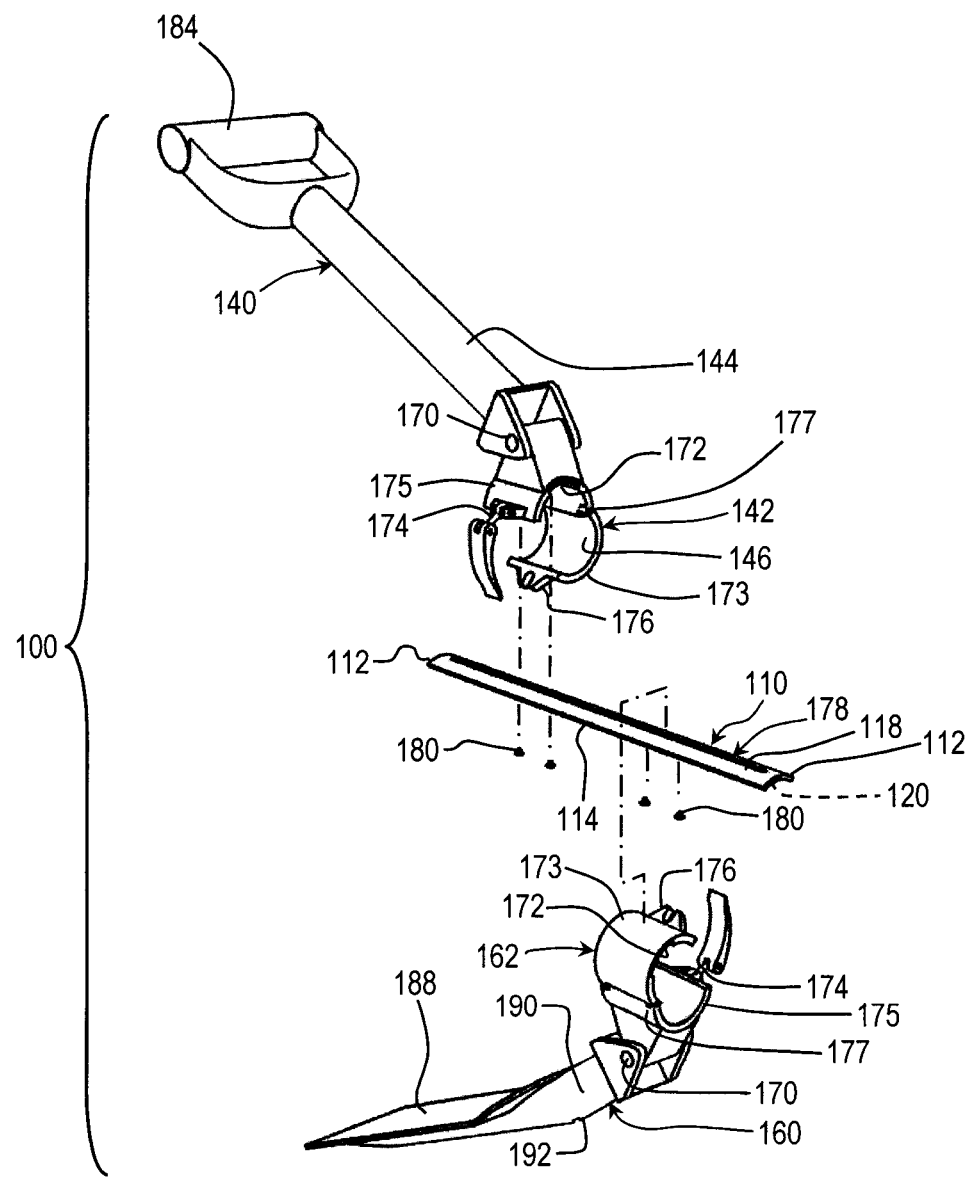
FIG. 8, in an exploded perspective view, illustrates the digging implement attachment of FIGS. 1 to 3.

As illustrated in FIG. 8, for example, the auxiliary handle assembly 140 has a substantially elongated configuration and includes an auxiliary handle attachment 142 for mounting the auxiliary handle assembly 140 to the main shaft 12, an auxiliary handle graspable 184 by a hand and an auxiliary handle spacing element 144 extending therebetween.

For example, the auxiliary handle attachment 142 takes the form of a clamp 142. The clamp 142 defines a clamp inner surface 146 configured and sized for engaging a combined cross-sectional circumference of the main shaft 12 and the linking element 110. Furthermore, the clamp 142 is user selectively engageable on the main shaft 12 between an unlocked configuration wherein the clamp 142 is longitudinally slidably movable along the combined circumference of the main shaft 12 and the at least one linking element 110 by being loosened relative to the main shaft 12, and a locked configuration wherein the clamp 142 is rigidly engaged at a user selected longitudinal position therealong, for example by gripping the main shaft 12 to substantially prevent longitudinal movements of the clamp 142 therealong.

Still referring to FIG. 8, the footplate assembly 160 also has a substantially elongated configuration and includes a footplate attachment 162 for mounting the footplate assembly 160 to the main shaft 12, a footplate 188 and a footplate spacing element 190 extending therebetween. For example, the footplate attachment 162 takes the form of a clamp 162. The clamp 162 defines a clamp inner surface 166 configured and sized for engaging a combined cross-sectional circumference of the main shaft 12 and the linking element 110 such that the footplate spacing element 190 may be extending away from the main shaft at a diametrically opposed radial angle relative to the handle assembly 140. Likewise the clamp 142, the clamp 162 is user selectively engageable thereon between an unlocked configuration wherein the clamp 162 is longitudinally slidably movable along the combined circumference of the main shaft 12 and the at least one linking element 110, and a locked configuration wherein the footplate attachment 162 is rigidly engaged at a user selected longitudinal position therealong. The clamps 142 and 162 are typically substantially similar to each other.

Thus, with the at least one linking element 110 longitudinally abutting at a user selected longitudinal position along the main shaft 12, at least one of the auxiliary handle assembly 140 and footplate assembly 160 may rigidly engaged in a locked configuration at a user selected longitudinal position along the linking element 110, and the other one of the auxiliary handle assembly 140 and footplate assembly 160 may be user selectively movable in an unlocked configuration along the linking element 110 without losing the diametrically opposed configuration of the auxiliary handle and footplate assemblies 140 and 160 relative to the main shaft 12.

In some embodiments, one or both the clamps 142 and 162 each individually include a pivotable joint 170 at their junction with the auxiliary handle spacing element 144 or the footplate spacing element 190. Each pivotable joint 170 is pivotable about a pivot axis oriented substantially transversely relative to main shaft 12, and at a sufficiently spaced apart location relative thereto for individually allowing each one of the auxiliary handle and footplate spacing elements 144 and 190 to pivot between two configurations that are for example respectively substantially parallel relative to the main shaft 12 and angled away from the main shaft 12.

Now referring to FIGS. 4, 5 and 8, in some embodiments, the clamps 142 and 162 are each represented by a two (2) parts hinged clamp defining opposed semi-cylindrical clamp inner surfaces that are suitably configured and sized, including a linking element receiving recess 172 extending longitudinally therein, for rigidly engaging a relatively short longitudinal portion of the combined circumference of the main shaft 12 and the linking element 110. It should be noted that in alternative embodiments, any other suitable attachments are used to secure the auxiliary handle and footplate assemblies 140 and 160 to the main shaft 12.

Each one of the clamps 142 and 162 includes first and second hinged clamp members 173 and 175 that selectively closable through a pivotable thumb screw 174 and paired fork shaped lip members 176 extending respectively from the first and second hinged clamp members 173 and 175 opposed their common hinge 177.

Thus, by using the thumb screw 174, each one of the clamps 142 and 162 is operable between an open configuration, wherein the combined circumference of the main shaft 12 and the at least one linking element 110 may be inserted laterally therein and removed laterally therefrom so that the 142 and 162 are removable from and attachable to the main shaft 12, an unlocked configuration, wherein the hinged clamp is in a closed configuration irremovable from the main shaft 12 but sufficiently loose to allow the auxiliary handle and footplate assemblies 140 and 160 to be individually slidably movable longitudinally along a respective length portion of the linking element 110 and main shaft 12, and a locked configuration, wherein the clamp 142 and 162 is sufficiently rigidly tightened around the combined circumference of the main shaft 12 and the linking element 110, for maintaining its position, along with the linking element 110, relative to the main shaft 12.

In some embodiments (not shown in the drawings), the portions of the semi-cylindrical clamp inner surfaces that come in contact with outer cylindrical surface portions of the main shaft 12 may be covered with a resilient material such as, for example, foam or rubber, for a better grip therebetween.

Referring now more particularly to FIGS. 1, 6, 7 and 8, in some embodiments, the linking element 110 defines an elongated slot 178 extending longitudinally therealong, typically along a substantial portion of the whole length of the linking element 110. The auxiliary handle assembly 140 and footplate assembly 160 are mounted to the linking element 110 so as to engage the slot 178 so that the auxiliary handle assembly 140 and footplate assembly 160 are movable relative to the slot 178 only through longitudinal movements therealong. Typically, the slot 178 extends through the linking element 110 between the linking element first and second surfaces 118 and 120. Referring to FIG. 7, the slot 178 has slot wider and narrower portions 179 and 181. For example, the slot 178 has substantially T-shaped cross-section. The slot wider portion 179 thereof is adjacent the linking element second surface 120, and the slot narrower portion 181 thereof is adjacent the linking element first surface 118. The slot wider portion 179 extends laterally to a larger extent than the slot narrower portion 181.

The slot 178 is usable, in cooperative relation with at least one, but typically two (2) pairs of pegs in the form of threaded screws 180 that are each engageable through the slot 178 and in a corresponding pair of threaded screw bores 182 defined along longitudinally centered inner surface portions of the linking element receiving recess 172 of the auxiliary handle and footplate assemblies 140 and 160. The threaded screws 180 or each pair are longitudinally spaced apart from each other.

Each threaded screw 180 is configured and sized so as to be tightened within their respective screw bores 182 while concurrently leaving their head portion, forming a peg wider portion, fully concealed within the slot wider portion 179 of the T-shaped cross-section of the slot 178, and leaving the at least one linking element 110 slidably movable longitudinally relative to the clamps 142 and 162 with the threaded portion of the screw 180, forming a peg narrower portion, received in the slot narrower portion 181. The slot 178 is dimensioned so that the head portion of the screw 180 is too large to go through the slot narrower portion 181.

Thus, the relative longitudinal movement between the linking element 110 and the clamps 142 and 162 is limited so as to avoid any slip off therewith. Furthermore, the thus mutually tied relation between the auxiliary handle and footplate assemblies 140 and 160, and linking element 110, provides a digging implement attachment 100 is more easily commercialized as a single integrated product on a store shelf.

Now referring to FIG. 1 for example, in some embodiments, the auxiliary handle 184 may take the form of a D-shaped handgrip member 184 extending from the auxiliary handle spacing element 144.

In a similar fashion, the footplate 188 may take the form of a plate facing substantially towards the main handle 14 of the digging implement 10. The footplate 188 is suitably sized and shaped for comfortably engaging at least a distal end portion of the foot of an average size person. The footplate spacing element 190 extends typically from the footplate 188, typically laterally centrally relative thereto, towards the clamp 162.

In some embodiments, the footplate 188 and footplate spacing element 190 are integrally formed, and may define a bend 192 substantially proximal the junction therebetween such that, in use, the footplate 188 may present at least a slightly less acute upwardly oriented angle relative to the footplate spacing element 190, as illustrated in sequential views in FIGS. 9A to 9C.

As would be obvious to someone familiar with the art of garden hand tools having an elongated handle shaft, in some embodiments (not shown in the drawings), the auxiliary handle and footplate spacing elements 144 and 190 may each be represented by a conventional two parts telescopic member that is user selectively length adjustable. This additional aspect provides enhanced adjustability of the digging implement attachment 100, according to the present invention, to suite even more particularly a special digging and shoveling operation with a digging implement 10.

In some embodiments, as illustrated in FIGS. 10A and 10B, the digging implement attachment 200 is substantially similar to the first embodiment of a digging implement attachment 100 described above, except that it further includes a releasable auxiliary handle assembly storage attachment 202 and a releasable footplate assembly storage attachment 203. The auxiliary handle assembly storage attachment 202 is provided for reversibly securing the auxiliary handle spacing element 144 to the main shaft 12 substantially adjacent and parallel thereto. The releasable footplate assembly storage attachment 203 is provided for reversibly securing the footplate spacing element 190 to the main shaft 12 substantially adjacent and parallel thereto. The auxiliary handle assembly and foot plate assembly storage attachments 202 and 203 are typically substantially similar to each other and may be represented by a substantially C-shaped retaining clamp defining a retaining clamp proximal portion 204 and a retaining clamp open end portion 206 extending distally thereof.

The retaining clamp proximal portion 204 is integrally formed with, or otherwise attached to, a respective one of the auxiliary handle and footplate spacing elements 144 and 190 respectively, and substantially adjacent a respective one of the clamps 142 and 162, so as to have the retaining clamp open end portion 206 extending perpendicularly therefrom. Furthermore, each one of the retaining clamp open end portions 206 is oriented so as to engage the main shaft 12 when the auxiliary handle and footplate spacing elements 144 and 190 are parallel to the main shaft 12 and oriented towards the main handle 14, as illustrated in FIG. 10A.

The retaining clamp open end portion 206 is suitably configured and sized for selectively resiliently engaging a circumferential portion of the main shaft 12 of the digging implement 10, including a circumferential portion of the at least one linking element 110 that may be extending longitudinally between substantially C-shaped arms thereof.

Thus, each one of the auxiliary handle and footplate assemblies 140 and 160 may be user selectively retracted and retained in a predetermined angular relationship relative to the main shaft 12, typically in a substantially parallel configuration relative to the main shaft 12, when either one, or both handle and footplate assemblies 140 and 160 are not necessary during a digging and shoveling operation, or for retracting both the handle and footplate assemblies 140 and 160 in a compact format along the main shaft 12 for convenient storage purposes.

As is well known in the art of garden hand tools, the various components of the digging implement attachment 100 described above may be made of any suitably rigid material, or materials, such as, for example, aluminum, stainless steel, a polymeric material such as Nylon®, PVC or ABS, or a combination thereof.

A method of using the digging implement attachment 100 will now be described. Beforehand, the auxiliary handle and footplate assemblies 140 and 160 are positioned and tightened, along with the at least one linking element 110, on a user selected longitudinal position of the main shaft 12 so that the auxiliary handle and footplate assemblies 140 and 160 are substantially diametrically opposed relative to the main shaft 12, and substantially perpendicularly positioned relative to an imaginary horizontal plane of the digging head 16.

In a first step, as illustrated in sequential views in FIGS. 9A, 9B and 9C, with one hand grabbing the main handle 14, the other hand grabbing the auxiliary handle 184, and a foot selectively pressing on the footplate 188, digging and shoveling work may be done.

In a second step, in order to position the auxiliary handle or footplate assemblies 140 or 160 to suite a particular shoveling context, the user sufficiently loosens the thumb screw 174 of the selected one of the auxiliary handle and footplate assemblies 140 and 160 so as to be able to manually slide longitudinally the latter along the linking element 110.

In a third step, the user adjusts the longitudinal position of the selected auxiliary handle and footplate assemblies 140 and 160 to a user selected position along the linking element 110.

In a fourth step, the user sufficiently tightens the loosened thumb screw 174 so as to fixedly secure the selected auxiliary handle and footplate assemblies 140 and 160 at the user selected position along the linking element 110.

Optionally, steps two to four above may be repeated to adjust the longitudinal position of the other one of the auxiliary handle and footplate assemblies 140 and 160 to a new position along the linking element 110.

Thus, with one of the auxiliary handle and footplate assemblies 140 or 160 fixedly engaged on the main shaft 12 and, consequently, substantially rigidly retaining the linking element 110 longitudinally aligned parallelly relative to the latter, the longitudinal position of the other one of the auxiliary handle and footplate assemblies 140 and 160 may be substantially easily and single handedly adjusted by the user along the linking element 110 without losing its perpendicular alignment relative to the general horizontal plane of the digging head 16.

To remove the digging implement attachment 100 from the digging implement 10, the user simply loosens both thumb screws 174 in order to open the clamps 142 and 162 auxiliary handle and footplate assemblies 140 and 160, followed with removing the digging implement attachment 100 from the main shaft 12.

Figure 11:
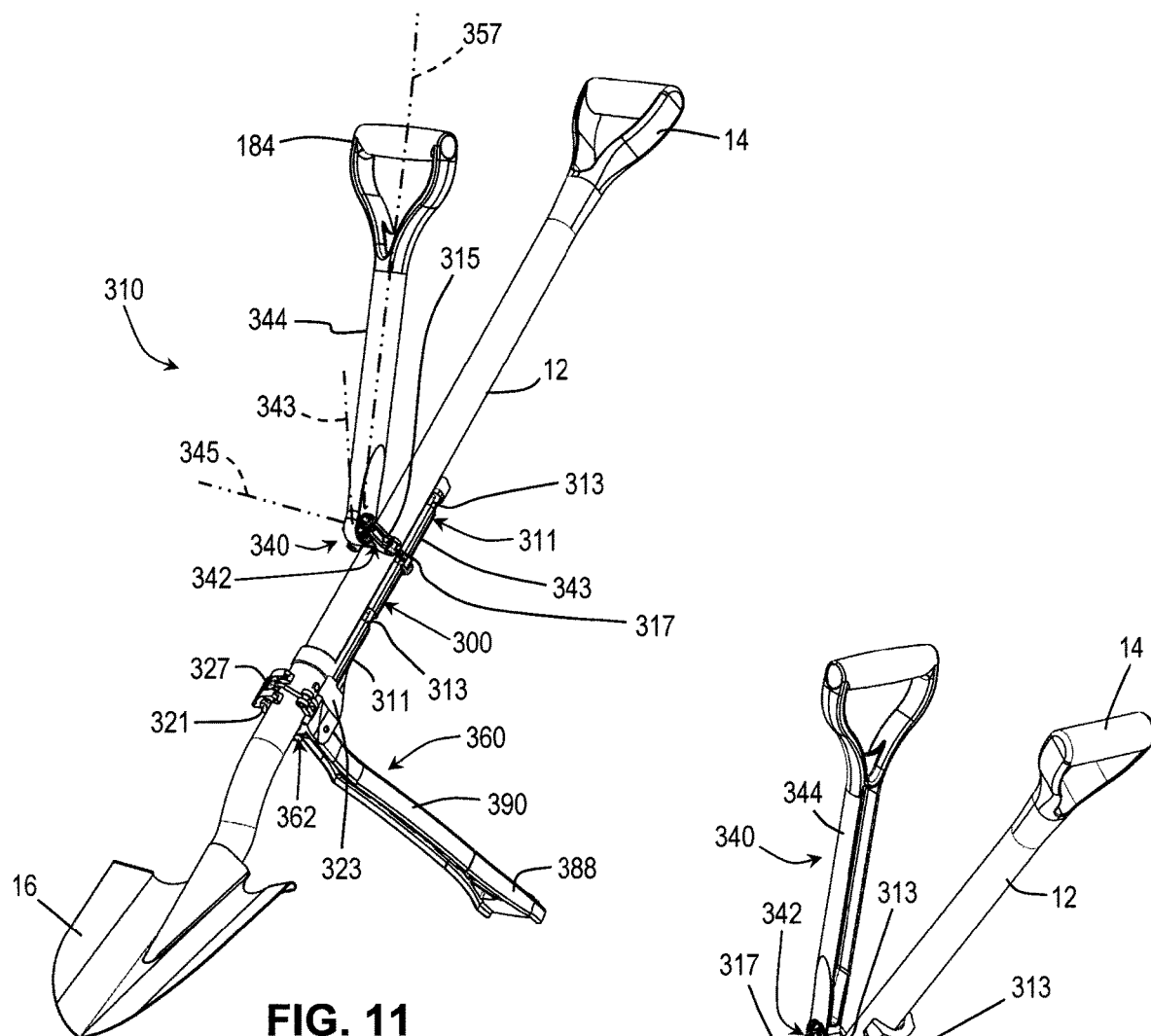
FIG. 11, in a perspective view, illustrates an alternate digging implement including another alternate embodiment of a digging implement attachment in accordance with the present invention.
Figure 12:
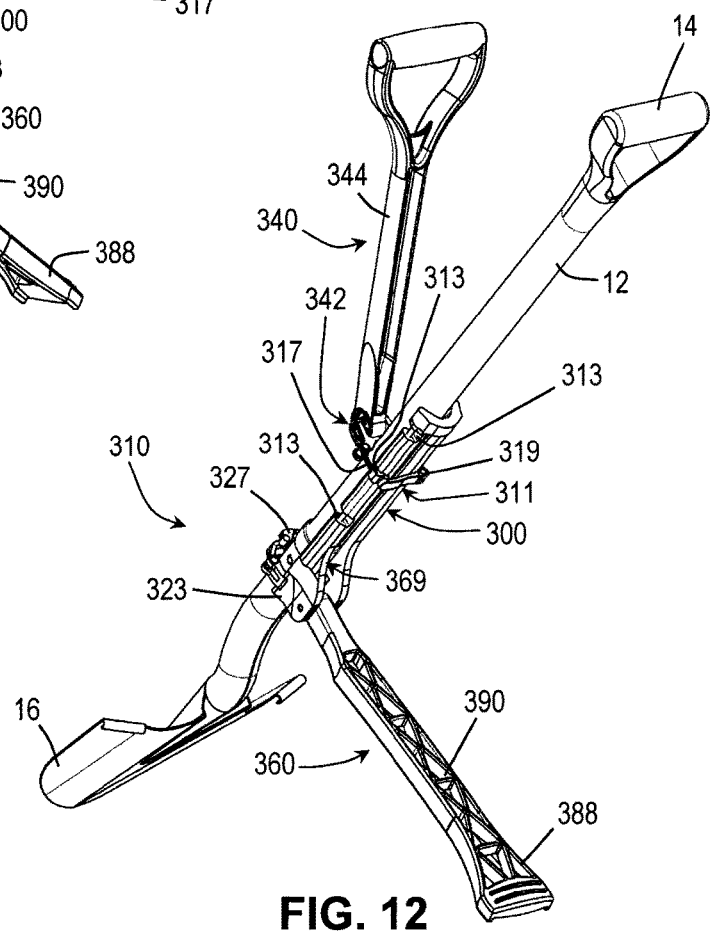
FIG. 12, in an alternate perspective view, illustrates the digging implement of FIG. 11.

With reference to FIGS. 11 and 12, there is shown a digging implement 310 including an alternative embodiment of a digging implement attachment 300. The digging implement attachment 300 is similar in many respects to the digging implement attachments 100 and 200 and only the differences therewith are described hereinbelow.

Figure 12A:
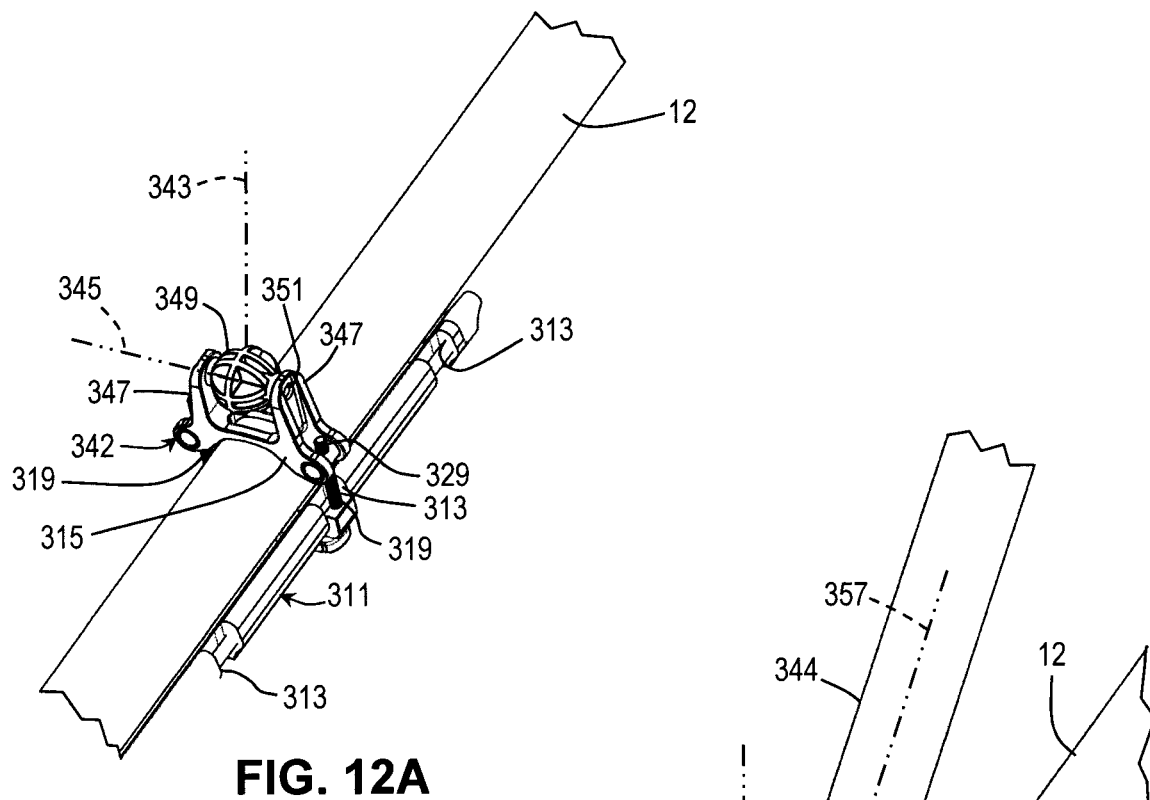
FIG. 12A, in a perspective view with parts removed, illustrates an alternate auxiliary handle assembly part of the digging implement of FIGS. 11 and 12.
Figure 12B:
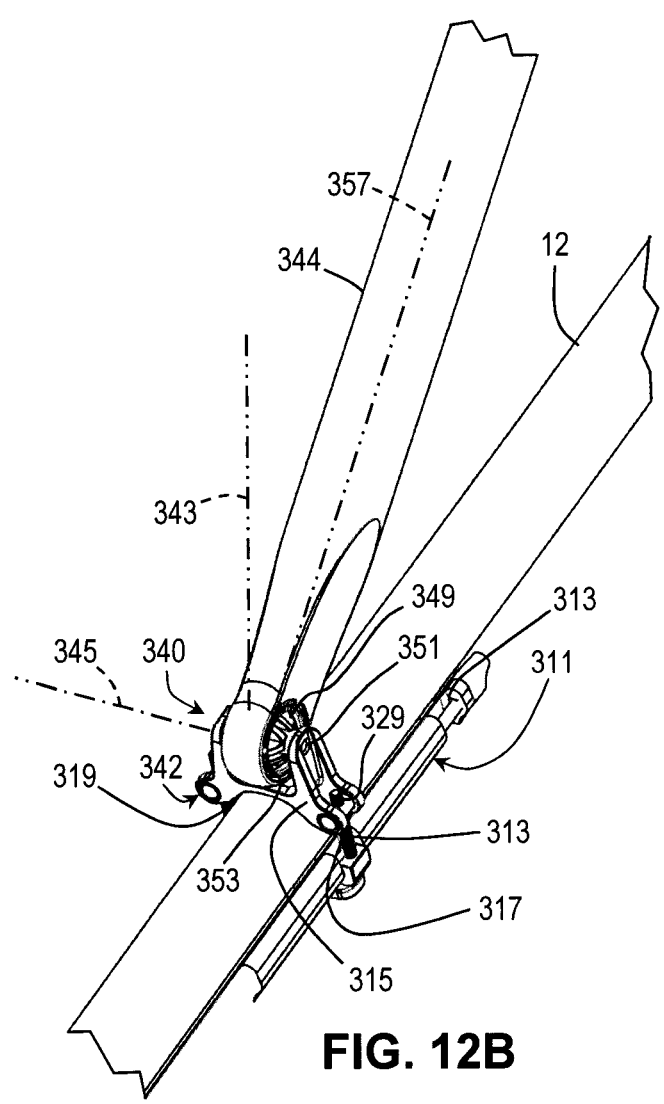
FIG. 12B, in a partial perspective view, illustrates the alternate auxiliary handle assembly of FIG. 12A.

First, the auxiliary handle spacing element 344 is mounted to the clamp 342 so as to be pivotable relative thereto about at least two different pivoting axes 343 and 345. To that effect, as better seen in FIGS. 12A and 12B, the clamp 342 defines a pair of arms 347 extending therefrom generally away from the main shaft 12. A generally spherical element 349 is supported between the arms 347 so as to be pivotable about an axle 351 mounted to the arms 347 and extending laterally relative to the main shaft 12. As shown in FIG. 12A, the generally spherical element 349 is not necessarily spherical, but its outer surface is mostly located on a sphere. Referring to FIG. 12B, the auxiliary handle spacing element 344 defines a mounting aperture 353 extending substantially laterally therethrough, opposed to the auxiliary handle 184 (not seen in FIG. 12B). The mounting aperture 353 defines a substantially annular aperture internal surface (not shown in the drawings) that is concave so as to conform to the size and shape of the spherical element 349, while being loose enough relative thereto to be movable relative thereto.

It should be noted that this configuration of the mounting aperture 353 and spherical element 349 allows also rotation of the auxiliary handle spacing element 344 about an auxiliary handle spacing element longitudinal axis 357 extending between the clamp 342 and the auxiliary handle 184, along the auxiliary handle spacing element 344. Therefore, the auxiliary handle 184 can be moved in space about 3 different axes, which may facilitate digging in relatively inaccessible locations.

Referring to FIGS. 11 and 12, another particularity of the digging implement attachment 310 is that one of the footplate assembly 360 and auxiliary handle assembly 340 is fixed relative to the linking element 311 and the other one of the footplate assembly 360 and auxiliary handle assembly 340 is selectively movable relative to the linking element 311. In the present embodiment, it is the footplate assembly 360 that is fixed relative to the linking element 311.

Also, the auxiliary handle assembly 340 is lockable relative to the linking element 311 only at discrete positions therealong so that a distance between the footplate assembly 360 and auxiliary handle assembly 340 is settable only to discrete distances between a minimal distance and a maximal distance.

To that effect, the linking element 311, similarly to the linking element 110, defines a linking element shaft abutting surface conforming to the main shaft 12. However, the linking element 311, and linking element shaft abutting surface, extend over a relatively large portion of the circumference of the main shaft 12 so that the linking element 311 protrudes laterally relative to the main shaft 12. Notches 313 extend laterally into the linking element 311, pairwise laterally opposed to each other, at discrete longitudinal positions therealong.

As better seen in FIGS. 12A and 12B, the auxiliary handle assembly attachment 342 includes a clamp member 315 that conforms the shape of the main shaft 12. The functionality of the clamp member 175 in the digging implement attachment 100 is provided by the linking element 311. A pair of screws 317 and 319 extend between each one of the notches 313 of a pair of notches 313 and the clamp member 315. The first screw 317 is screwed in a correspondingly shaped bore 329 of the clamp member 315, with the screw head thereof (not shown in the drawings), positioned opposite the main shaft 12 relative to the linking element 311, and abutting the linking element 311 adjacent the notches 313. This screw head is larger than the width of the notches 313. The other screw 319 is similarly positioned, but is a thumb screw 319, that may be screwed and unscrewed by hand. The first screw 317 is typically a conventional screw that required a screwdriver to be screwed.

Therefore, when the auxiliary handle assembly attachment 342 is locked to the linking element 311, the main shaft 12 is received between the clamp member 315 and the linking element 311. The screws 317 and 319 complete an assembly that circumferentially circumscribe the main shaft 12. When the screws 317 and 319 are tight enough, the main shaft 12 is clamped between the clamp member 342 and the linking element 311 and prevented to move laterally by the shape of the clamp member 315 and the linking element 311 and the screws 317 and 319. Finally, the auxiliary handle assembly attachment 342 is fixed longitudinally along the linking element 311 through interference between the notches 313 and the screws 317 and 319, in addition to any frictional forces dues to clamping to the main shaft 12. Movement of the auxiliary handle assembly attachment 342 along the linking element 311 is allowed when the screws 317 and 319 are removed from the notches 313. It should be noted that instead of notches 313, the linking element 311 may be provided with apertures to perform the same functions.

Referring to FIG. 11, the footplate attachment 362 differs from the auxiliary handle attachment 342 in that it is fixed relative to the linking element 311. Therefore, the linking element 311 extends integrally from the footplate attachment 362. To that effect, the footplate attachment 362 may for example include a pair of clamp members 321 and 323 conforming to the main shaft 12 and hingedly attached to each other through a hinge. The linking element 311 extends from the clamp member 323, typically integrally therefrom. A conventional quick release lever and screw assembly 327 extends between the clamp members 321 and 323 opposed to the hinge and allows tightening and releasing the footplate attachment 362 about the main shaft 12.

Another difference with previously described digging implement attachments 100 and 200 resides in that the footplate 388 and footplate spacing element 390 are integrally formed and together form a substantially elongated member that includes a wider portion opposed to the footplate attachment 362.

With reference to FIGS. 13 and 14, there is shown a digging implement 410 including an alternative embodiment of a digging implement attachment 400. The digging implement attachment 400 is similar in many respects to the digging implement attachments 100, 200 and 300, and only the differences therewith are described hereinbelow.

As better seen in FIG. 14, in the digging implement attachment 400, the linking element 411 includes a pair of rods 431 laterally spaced apart from each other and extending substantially longitudinally from the footplate attachment 462 substantially parallel to the main shaft 12. In some embodiments, the rods 431 are linked to each other through a linking member 433 opposed to the footplate attachment 462. In these embodiments, the linking element 411 is therefore substantially U shaped.

The footplate attachment 462 is fixed relative to the rods 431, for example by being soldered or otherwise fixed thereto. The auxiliary handle attachment 442 is similar to the auxiliary handle attachment 342, except that it defines a pair of laterally spaced apart apertures 435 each slidably receiving thereinto one of the rods 431. When the auxiliary handle attachment 442 is in the unlocked configuration, ie loosened relative to the main shaft 12, the auxiliary handle attachment 442 slides on the rods 431 to move relative to the footplate attachment 462. Similarly, when the footplate attachment 462 is in the unlocked configuration, the rods 431 may move relative to the auxiliary handle attachment 442 to allow movements of the footplate attachment 462. In some embodiments, the footplate attachment 462 is similar to the auxiliary handle attachment 442, except that it is fixed relative to the rods 431. Therefore, auxiliary handle assembly 440 is continuously movable relative to the linking element 311 so that a distance between the footplate assembly 460 and auxiliary handle assembly 440 is settable continuously between a minimal distance and a maximal distance.

Another difference with previously described digging implement attachments 100, 200 and 300 resides in that the footplate 488 and footplate spacing element 490 are integrally formed and together form a substantially elongated member that is of substantially uniform transversal perimeter therealong. Therefore, there is no marked difference between the footplate 388 and footplate spacing element 390.

Finally, FIGS. 15A to 15F illustrate various footplate assemblies 560A to 560F respectively. The footplate assemblies 560A to 560F differ from each other in the shape of a footplate member 537A to 537F integrally forming the footplate and footplate spacing element.

Figure 15A:
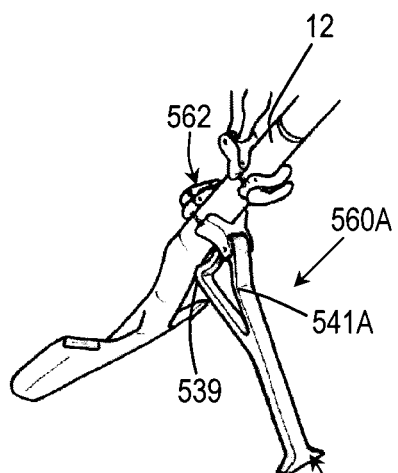
FIGS. 15A to 15F, in perspective views, illustrate various embodiments of a footplate assembly usable in the digging implements and digging implement attachments shown in FIGS. 1, 2, 3, 11, 12, 13 and 14.

Referring to FIG. 15A, the footplate member 537A defines a footplate spacing element protrusion 539A configured and sized to limit pivotal movement of the footplate spacing element beyond a predetermined position, for example perpendicular to the main shaft 12, by abutting against the main shaft. To that effect, the footplate member 537A defines a substantially triangular head 541A on which the footplate spacing element protrusion 539A is formed spaced apart from the footplate assembly attachment 562A.

Figure 15B:
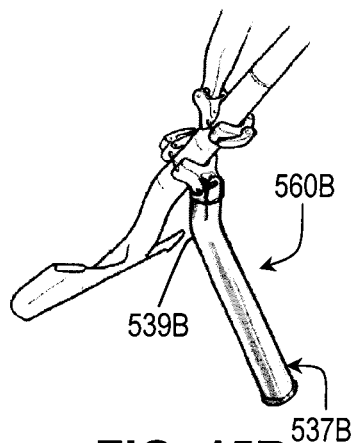

Referring to FIG. 15B, the footplate member 537B is substantially elongated and of constant disc-shaped transversal cross-sectional configuration therealong. The footplate member 537B defines a bend 539B therein.

Figure 15C:
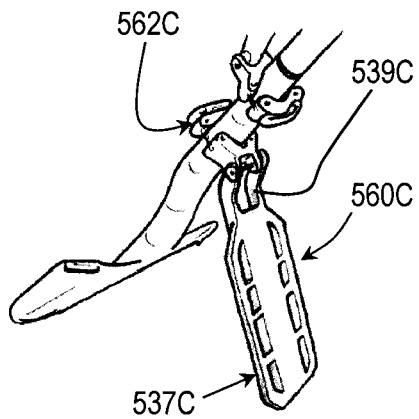

Referring to FIG. 15C, the footplate member 537C is substantially plate-shaped and defines a fork 539C pivotally secured to the footplate assembly attachment 562C.

Figure 15D:
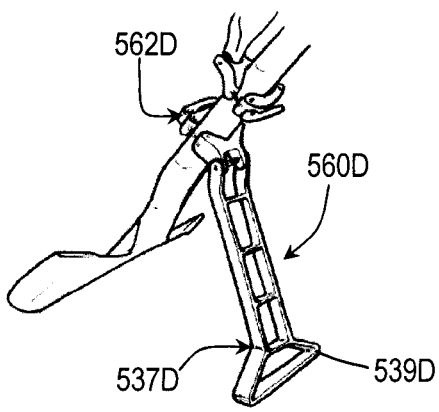

Referring to FIG. 15D, the footplate member 537D is not full but includes instead elongated members extending from each other to define a generally elongated structure provided with a wider portion 539D opposed to the footplate assembly attachment 562D.

Figure 15E:
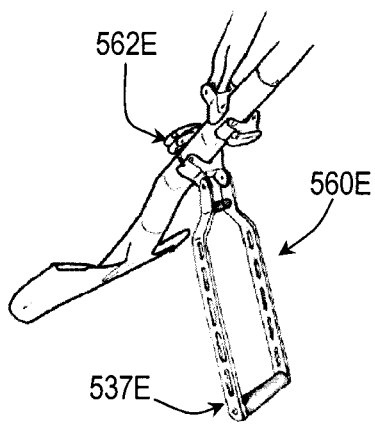

Referring to FIG. 15E, the footplate member 537E is substantially similar in general shape to the footplate member 537C, but is mostly empty as it only includes members delimiting the periphery thereof, except adjacent the footplate assembly attachment 562E.

Figure 15F:
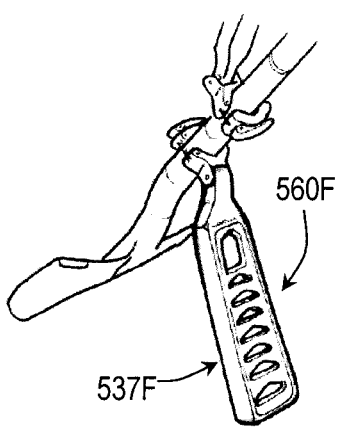

Referring to FIG. 15F, the footplate member 537F is also substantially plate-shaped.

Although the present invention has been described hereinabove by way of exemplary embodiments thereof, it will be readily appreciated that many modifications are possible in the exemplary embodiments without materially departing from the novel teachings and advantages of this invention. Accordingly, the scope of the claims should not be limited by the exemplary embodiments, but should be given the broadest interpretation consistent with the description as a whole. The present invention can thus be modified without departing from the spirit and nature of the subject invention as defined in the appended claims.

What is claimed is:

1. A digging implement, said digging implement comprising:
   a digging head;

a substantially elongated main shaft extending from said digging head;

a main handle secured to said main shaft substantially opposed to said digging head;

an auxiliary handle assembly mounted to said main shaft between said digging head and said main handle, said auxiliary handle assembly being mountable to said main shaft at auxiliary handle assembly first and second positions that are longitudinally spaced apart from each other along said main shaft; and a footplate assembly mounted to said main shaft between said digging head and said main handle, said footplate assembly being mountable to said main shaft at footplate assembly first and second positions that are longitudinally spaced apart from each other along said main shaft;

wherein said footplate assembly is mounted to said main shaft between said auxiliary handle assembly and said digging head;

the digging implement further comprising a linking element operatively coupled to said auxiliary handle and footplate assemblies for maintaining substantially fixed a relative angular position therebetween about said main shaft as said auxiliary handle assembly is moved between said auxiliary handle assembly first and second positions and said footplate assembly is moved between said footplate assembly first and second positions;

wherein said linking element defines an elongated member engaging at least one of said auxiliary handle and footplate assemblies so said at least one of said auxiliary handle and footplate assemblies is movable therealong.

2. The digging implement as claimed in claim 1, wherein said auxiliary handle and footplate assemblies are alternatively mountable to said main shaft spaced apart from each other by at least two different longitudinal distances therebetween.

3. The digging implement as claimed in claim 1, wherein said auxiliary handle assembly includes an auxiliary handle attachment for mounting said auxiliary handle assembly to said main shaft;

an auxiliary handle graspable by a hand; and an auxiliary handle spacing element extending therebetween.

4. The digging implement as claimed in claim 3, wherein said auxiliary handle attachment includes a clamp operable between a locked configuration and an unlocked configuration, wherein, in said locked configuration, said clamp grips said main shaft to substantially prevent longitudinal movements of said clamp along said main shaft, and, in said unlocked configuration, said clamp is loosened relative to said main shaft so as to be longitudinally movable therealong and wherein in said unlocked configuration, said clamp is irremovable from said main shaft, said clamp being further operable to an open configuration wherein said clamp is removable from said main shaft.

5. The digging implement as claimed in claim 3, wherein said auxiliary handle spacing element is pivotally mounted to said auxiliary handle attachment so as to be movable between auxiliary handle spacing element first and second positions, said auxiliary handle spacing element and main shaft having different angular relationships therebetween in said auxiliary handle spacing element first and second positions.

6. The digging implement as claimed in claim 5, further comprising a releasable auxiliary handle assembly storage attachment for reversibly securing said auxiliary handle spacing element to said main shaft in said auxiliary handle spacing element first position, wherein said auxiliary handle spacing element and main shaft are substantially parallel to each other in said auxiliary handle spacing element first position.

7. The digging implement as defined in claim 6, wherein said auxiliary handle spacing element is mounted to said auxiliary handle attachment so as to be pivotable relative thereto about at least two different pivoting axes and wherein said auxiliary handle spacing element is mounted to said auxiliary handle attachment so as to be rotatable about an auxiliary handle spacing element longitudinal axis extending between said auxiliary handle attachment and said auxiliary handle.

8. The digging implement as claimed in claim 1, wherein said footplate assembly includes a footplate attachment for mounting said footplate assembly to said main shaft;

a footplate; and a footplate spacing element extending therebetween.

9. The digging implement as claimed in claim 8, wherein said footplate attachment includes a clamp operable between a locked configuration and an unlocked configuration, wherein, in said locked configuration, said clamp grips said main shaft to substantially prevent longitudinal movements of said clamp along said main shaft, and, in said unlocked configuration, said clamp is loosened relative to said main shaft so as to be longitudinally movable therealong and wherein in said unlocked configuration, said clamp is irremovable from said main shaft, said clamp being further operable to an open configuration wherein said clamp is removable from said main shaft.

10. The digging implement as claimed in claim 8, wherein said footplate spacing element is pivotally mounted to said footplate attachment so as to be movable between footplate spacing element first and second positions, said footplate spacing element and main shaft having different angular relationships therebetween in said footplate spacing element first and second positions.

11. The digging implement as claimed in claim 10, further comprising a releasable footplate assembly storage attachment for reversibly securing said footplate spacing element to said main shaft in said footplate spacing element first position, wherein said footplate spacing element and main shaft are substantially parallel to each other in said footplate spacing element first position.

12. The digging implement as claimed in claim 11, wherein said footplate spacing element defines a footplate spacing element protrusion configured and sized to limit pivotal movement of said footplate spacing element beyond said footplate spacing element second position by abutting against said main shaft.

13. The digging implement as claimed in claim 1, wherein one of said footplate assembly and auxiliary handle assembly is fixed relative to said linking element and an other one of said footplate assembly and auxiliary handle assembly is selectively movable relative to said linking element.

14. The digging implement as claimed in claim 13, wherein said other one of said footplate assembly and auxiliary handle assembly is continuously movable relative to said linking element so that a distance between said footplate assembly and auxiliary handle assembly is settable continuously between a minimal distance and a maximal distance.

15. The digging implement as claimed in claim 13, wherein said other one of said footplate assembly and auxiliary handle assembly and said linking element are configured and sized so that said other one of said footplate assembly and auxiliary handle assembly is lockable relative to said linking element only at discrete positions therealong so that a distance between said footplate assembly and auxiliary handle assembly is settable only to discrete distances between a minimal distance and a maximal distance.

16. A digging implement attachment usable with a digging implement including a digging head, a substantially elongated main shaft extending from said digging head, and a main handle secured to said main shaft substantially opposed to said digging head, said digging implement attachment comprising:
- an auxiliary handle assembly mountable to said main shaft at auxiliary handle assembly first and second positions that are longitudinally spaced apart from each other along said main shaft;
- a footplate assembly mountable to said main shaft at footplate assembly first and second positions that are longitudinally spaced apart from each other along said main shaft; and
- a linking element operatively coupled to said auxiliary handle and footplate assemblies for maintaining substantially fixed a relative angular position therebetween about the main shaft as said auxiliary handle assembly is moved between said auxiliary handle assembly first and second positions and said footplate assembly is moved between footplate assembly first and second positions when said digging implement attachment is operatively mounted to said digging implement;
- wherein said linking element defines an elongated member engaging at least one of said auxiliary handle and footplate assemblies so said at least one of said auxiliary handle and footplate assemblies is movable therealong.

17. The digging implement attachment as claimed in claim 16, wherein said auxiliary handle assembly includes
- an auxiliary handle attachment mountable to said main shaft;
- an auxiliary handle; and
- an auxiliary handle spacing element extending therebetween.

18. The digging implement attachment as claimed in claim 17, wherein said auxiliary handle attachment includes a clamp operable between a locked configuration and an unlocked configuration, wherein, with said digging implement attachment operatively mounted to said main shaft, in said locked configuration, said clamp grips said main shaft to substantially prevent longitudinal movements of said clamp along said main shaft, and, in said unlocked configuration, said clamp is loosened relative to said main shaft so as to be longitudinally movable therealong.

19. The digging implement attachment as claimed in claim 17, wherein said auxiliary handle spacing element is pivotally mounted to said auxiliary handle attachment.

20. The digging implement attachment as claimed in claim 19, further comprising a releasable auxiliary handle assembly storage attachment for reversibly securing said auxiliary handle spacing element and said main shaft to each other in a predetermined angular relationship relative to each other when said digging implement attachment is operatively mounted to said main shaft.

21. The digging implement attachment as defined in claim 19, wherein said auxiliary handle spacing element is mounted to said auxiliary handle attachment so as to be pivotable relative thereto about at least two different pivoting axes.

22. The digging implement attachment as defined in claim 21, wherein said auxiliary handle spacing element is mounted to said auxiliary handle attachment so as to be rotatable about an auxiliary handle spacing element longitudinal axis extending between said auxiliary handle attachment and said auxiliary handle.

23. The digging implement attachment as defined in claim 16, wherein said footplate assembly includes
- a footplate attachment for mounting said footplate assembly to said main shaft;
- a footplate; and
- a footplate spacing element extending therebetween.

24. The digging implement attachment as claimed in claim 23, wherein said footplate attachment includes a clamp operable between a locked configuration and an unlocked configuration, wherein, with said digging implement attachment operatively mounted to said main shaft, in said locked configuration, said clamp grips said main shaft to substantially prevent longitudinal movements of said clamp along said main shaft, and, in said unlocked configuration, said clamp is loosened relative to said main shaft so as to be longitudinally movable therealong.

25. The digging implement attachment as claimed in claim 23, wherein said footplate spacing element is pivotally mounted to said footplate attachment.

26. The digging implement attachment as claimed in claim 25, further comprising a releasable footplate assembly storage attachment for reversibly securing said footplate spacing element and said main shaft to each other in a predetermined angular relationship relative to each other when said digging implement attachment is operatively mounted to said main shaft.

27. The digging implement attachment as claimed in claim 25, wherein said footplate spacing element defines a footplate spacing element protrusion configured and sized to limit pivotal movement of said footplate spacing element beyond a predetermined angle relative to said main shaft when operatively mounted to said main shaft by abutting against said main shaft.

28. The digging implement attachment as claimed in claim 16, wherein said linking element is substantially elongated and defines a slot extending therealong, said auxiliary handle assembly and footplate assembly being mounted to said linking element so as to engage said slot so that said auxiliary handle assembly and footplate assembly are movable relative to said slot only through longitudinal movements therealong.

29. The digging implement attachment as claimed in claim 16, wherein
- said linking element defines substantially opposed linking element first and second surfaces, said linking element second surface facing said main shaft when said digging implement attachment is operatively mounted to said main shaft; and
- said linking element second surface is concave.

30. The digging implement attachment as claimed in claim 16, wherein one of said footplate assembly and auxiliary handle assembly is fixed relative to said linking element and an other one of said footplate assembly and auxiliary handle assembly is selectively movable relative to said linking element.

31. The digging implement attachment as claimed in claim 30, wherein said other one of said footplate assembly and auxiliary handle assembly is continuously movable relative to said linking element so that a distance between said footplate assembly and auxiliary handle assembly is settable continuously between a minimal distance and a maximal distance.

32. The digging implement attachment as claimed in claim 30, wherein said other one of said footplate assembly and auxiliary handle assembly is lockable relative to said linking element only at discrete positions therealong so that a distance between said footplate assembly and auxiliary handle assembly is settable only to discrete distances between a minimal distance and a maximal distance.

33. A digging implement, said digging implement comprising:
a digging head;
a substantially elongated main shaft extending from said digging head;
a main handle secured to said main shaft substantially opposed to said digging head;
an auxiliary handle assembly mounted to said main shaft between said digging head and said main handle, said auxiliary handle assembly being mountable to said main shaft at auxiliary handle assembly first and second positions that are longitudinally spaced apart from each other along said main shaft; and
a footplate assembly mounted to said main shaft between said digging head and said main handle, said footplate assembly being mountable to said main shaft at footplate assembly first and second positions that are longitudinally spaced apart from each other along said main shaft;
wherein said footplate assembly is mounted to said main shaft between said auxiliary handle assembly and said digging head;
said auxiliary handle assembly including
an auxiliary handle attachment for mounting said auxiliary handle assembly to said main shaft, said auxiliary handle attachment including a clamp operable between a locked configuration and an unlocked configuration, wherein, in said locked configuration, said clamp grips said main shaft to substantially prevent longitudinal movements of said clamp along said main shaft, and, in said unlocked configuration, said clamp is loosened relative to said main shaft so as to be longitudinally movable therealong and wherein in said unlocked configuration, said clamp is irremovable from said main shaft, said clamp being further operable to an open configuration wherein said clamp is removable from said main shaft;
an auxiliary handle graspable by a hand; and
an auxiliary handle spacing element extending therebetween.

34. A digging implement, said digging implement comprising:
a digging head;
a substantially elongated main shaft extending from said digging head;
a main handle secured to said main shaft substantially opposed to said digging head;
an auxiliary handle assembly mounted to said main shaft between said digging head and said main handle, said auxiliary handle assembly being mountable to said main shaft at auxiliary handle assembly first and second positions that are longitudinally spaced apart from each other along said main shaft; and
a footplate assembly mounted to said main shaft between said digging head and said main handle, said footplate assembly being mountable to said main shaft at footplate assembly first and second positions that are longitudinally spaced apart from each other along said main shaft;
wherein said footplate assembly is mounted to said main shaft between said auxiliary handle assembly and said digging head;
said auxiliary handle assembly including
an auxiliary handle attachment for mounting said auxiliary handle assembly to said main shaft;
an auxiliary handle graspable by a hand; and
an auxiliary handle spacing element extending therebetween, wherein said auxiliary handle spacing element is pivotally mounted to said auxiliary handle attachment so as to be movable between auxiliary handle spacing element first and second positions, said auxiliary handle spacing element and main shaft having different angular relationships therebetween in said auxiliary handle spacing element first and second positions.

35. A digging implement, said digging implement comprising:
a digging head;
a substantially elongated main shaft extending from said digging head;
a main handle secured to said main shaft substantially opposed to said digging head;
an auxiliary handle assembly mounted to said main shaft between said digging head and said main handle, said auxiliary handle assembly being mountable to said main shaft at auxiliary handle assembly first and second positions that are longitudinally spaced apart from each other along said main shaft; and
a footplate assembly mounted to said main shaft between said digging head and said main handle, said footplate assembly being mountable to said main shaft at footplate assembly first and second positions that are longitudinally spaced apart from each other along said main shaft;
wherein said footplate assembly is mounted to said main shaft between said auxiliary handle assembly and said digging head;
the digging implement further comprising a linking element operatively coupled to said auxiliary handle and footplate assemblies for maintaining substantially fixed a relative angular position therebetween about said main shaft as said auxiliary handle assembly is moved between said auxiliary handle assembly first and second positions and said footplate assembly is moved between said footplate assembly first and second positions;
wherein said linking element defines an elongated aperture engaging at least one of said auxiliary handle and footplate assembly so said at least one of said auxiliary handle and footplate assembly is movable therealong.

* * * * *